United States Patent [19]
Filthuth

[11] Patent Number: 4,965,861
[45] Date of Patent: Oct. 23, 1990

[54] TWO-DIMENSIONAL PROPORTIONAL COUNTER FOR POSITION SENSITIVE MEASUREMENT OF IONIZING RADIATION

[76] Inventor: Heinz A. A. W. Filthuth, Bahnhofstrasse 29, D-7540 Neuenburg, Fed. Rep. of Germany

[21] Appl. No.: 258,725

[22] Filed: Oct. 17, 1988

[30] Foreign Application Priority Data

Oct. 17, 1987 [DE] Fed. Rep. of Germany ....... 3735296

[51] Int. Cl.[5] .............................................. G01T 1/185
[52] U.S. Cl. .................................. 250/385.1; 250/374
[58] Field of Search .................. 250/385.1, 374, 385.2; 333/138

[56] References Cited

U.S. PATENT DOCUMENTS

| | | | |
|---|---|---|---|
| 3,772,521 | 11/1973 | Perez-Mendez et al. | ...... 250/385 R |
| 4,019,057 | 4/1977 | Bram | ................................. 250/375 |
| 4,649,356 | 3/1987 | Kameya | ............................. 333/138 |
| 4,686,368 | 8/1987 | Anderson et al. | .................. 250/374 |

FOREIGN PATENT DOCUMENTS 3002950 7/1981 Fed. Rep. of Germany.

OTHER PUBLICATIONS

Zanevsky et al., " ... Proportional Chamber ... For ... TLC" Nulear Instrument & Meth. 153 (1978) p. 445.
IEEE Transactions on Nuclear Science, vol. NS-23, No. 1, Feb. 1976, Seiten 279-280, New York, USP. Lecomte et al.: "The delay line readout Technique Applied to Proportional Chambers Using Electronegative Gas Mixtures".
IEEE Transactivons on Nuclear Science, vol. NS—31, No. 1, Feb. 1984, Seiten 258—263, IEEE, New York, US;J-P. Richer et al.: "Cross talk in Multielectrode Particle detectors".
"The Delay Wire Chamber (DWC) Description", European Organization for Nuclear Research, CERN-LEP Division, Feb. 6, 1985, LEP/BI-TA/Note 85-3.
"Multiwire Proportional Chambers for Biomedical Application", *Nuclear Instruments and Methods* 106 (1978) 397-406.
"The Readout Metod For wire Chambers", *Nuclear Instuments and Methods in Physics Research A237* (1987) pp. 470-472.
"Electromagnetic Delay Lines in Spark, Proportional and Drift Chamber Applications", *Nuclear Instruments and Methods* 153 (1978) pp. 543-551.
"A MWPC with a Cathode Coupled Delay Line Read-Out as Radioactivity Detector for DNA Repair Studies", *Nuclear Instruments and Methods* 190 (1981) pp. 627-638.

(List continued on next page.)

Primary Examiner—Janice A. Howell
Assistant Examiner—Richard Hanig
Attorney, Agent, or Firm—Spensley Horn Jubas & Lubitz

[57] ABSTRACT

A two-dimensional proportional counter for position sensitive measurement of ionizing radiation in one plane comprises a counting chamber, in which a wire anode grid and at least one wire cathode grid are fastened spaced apart from one another and orthogonal to one another. The wires of these grids are connected directly to the windings of a continuous delay line to which the signals are fed for evaluation. The delay line has a continuous capacitor strip on its top. The dimensioning of the capacitor strip and of the other characteristic parameters of the delay line are slected such that the spacing of the grids from one another can be decreased to values below 2 mm, thus attaining a substantial increase in positional resolution, withou substantial impairment by the delay line of the form and amplitude of the pulses produced. Particularly simple and rapid measurement is attainable if a counting chamber of this design is combined with an automatic feed device for specimen plates, which in turn may also be coupled with a magazine, so that a certain number of specimen plates can be fed to the counting chamber completely automatically.

30 Claims, 6 Drawing Sheets

OTHER PUBLICATIONS

"Recent Developments in Delay Line Readout of Multiwire Proportional Chambers,", *I.E.E.E. Transactions on Nuclear Science*, vol. ns.21, No. 1, pp. 45–50, Feb. 1974.

"A Position Sensitive Microchannelplate Detector Using a Delay Line Readout Anode", *Nuclear Instruments and Methods in Physics Research* A258 (1987) 221–224.

"High-Count-Rate Porportional Counter for Soft X-Ray Position Detection", *Rev. Sci. Instrum.* 58(6), Jun. 1987, pp. 1077–1085.

"Linear, Circular and Two Dimensional Position Sensitive Detectors", *Nuclear Instruments and Methods* 152 (1978) 191–194.

"Multiwire Porportional Chamber Focal-Plane Detector", *Nuclear Instuments and Methods* 127 (1975) 29–39.

"Electromagnetic Delay Line Readout for Proportional Wire Chambers", *Nuclear Instruments and Methods* 89(1970) 257–262.

TWO-DIMENSIONAL PROPORTIONAL COUNTER FOR POSITION SENSITIVE MEASUREMENT OF IONIZING RADIATION

BACKGROUND OF THE INVENTION

This invention relates to a two-dimensional proportional counter for position sensitive measurement of ionizing radiation in one plane, the counter having a counting chamber with a wire anode grid and at least one wire cathode grid spaced apart from, and above and/or below, the anode grid. The directions of the parallel wires of the grid, or of both grids, used for the readout are disposed preferably orthogonally to one another, and each wire of these two wire grids couples in the pulses generated in them at a defined point of a delay line associated with the particular wire readout grid; from the delay line, the pulses are delivered to an evaluation unit for position determination.

A proportional counter of this type is described, for instance, in a paper by Kaplan et al in the journal NIM (Nuclear Instruments and Methods in Physics Research) 106 (1973), pp. 397–406 and a paper by Gabriel et al in NIM 152 (1978), pp. 191-194. In the proportional counter known from the first of the above papers, three wire grids are retained in separate synthetic resin frames stacked on one another. According to this paper, grid spacings of 3 to 10 mm can thus be attained, with a grid size of $20 \times 20$ cm$^2$.

The two delay lines are applied to the cathode wires extending out of the particular frame, which function as readout wires, so that a capacitive coupling of the signals on the cathode wires into the associated delay line is attained.

In the second paper named above (at page 193), the cathode wires are connected directly to individual sections of the delay line; here, the delay line is a so-called lumped delay line, for instance as known from a publication of the CERN LEP Division, "The Delay Wire Chamber Description" by Manarin et al dated Feb. 6, 1985. Here, the delay line comprises coil sections with ferrite cores, with taps attached between the sections and spaced apart from the cathode wires; the signals of the cathode wires are coupled into the delay line at these sections. Capacitors that serve to calibrate the individual coil sections are disposed at the taps; thus, a separate capacitance is associated with each separate coil section.

A proportional counter of this generic type is also disclosed in U.S. Pat. No. 3,772,521 to Perez-Mendez.

Finally, a paper by Bellazzini et al in NIM 190 (1981), pp. 627-638, describes a generic proportional counter in which a continuous delay line, which as in the previously mentioned publications is capacitively coupled to the cathode wires, is used for evaluation. In the proportional counter according to this paper, the distance between the cathode grids and the anode grid is 6 mm, and the counting chamber is assembled from six fiberglass frames, the inner frames of which are correspondingly 6 mm thick and each support one of the three wire grids. The active area of this proportional counter is $25 \times 25$ cm$^2$.

To attain high positional resolution, it is desirable on the one hand to dispose the grids used for the readout as close as possible to one another or to the anode grid, in particular to minimize the undesirable parallax dictated by oblique tracks of secondary particles. On the other hand, reducing the spacing between these planes in counting chambers of the aforementioned general size, gives rise to problems relating to mechanical stability and tolerance, which mean that the relative variations in the grid spacings becomes extensive enough to impair the quality of measurement. This is primarily because the distance between the anode grid and the cathode grid, or in other words the readout plane, affects the amplification of the counting pulse, and thus affects its pulse shape and finally the positional resolution. Local tolerance variations within these distances therefore lead to local fluctuations in the charge multiplication and to an impairment of the measurement quality.

Unfortunately, minimizing the spacing between planes, which is desired for the above reasons, also means that because of the shortened mean path of the particles in the counting gas, the primary ionization is low, which leads to a reduction of the pulse amplitudes at the readout grids, yet an increase in the high voltage that could counteract this effect is limited in turn by the aforementioned relative local tolerances in the grid spacings; accordingly, there is an increased tendency of puncture voltage phenomena at points where the grid spacing is less than the mean value. As a result, with very close spacing of the grid planes, only a low pulse height is available. This in turn requires that the electronic means for further processing, that is at least the delay line associated with the readout grids, have an optimal quality, in the sense that the position signal present from one grid should be coupled with as little diminution as possible into the delay line, and should reach the particular end of the delay line with the least possible loss and with as much "shape fidelity" as possible, or in other words without reflection and with the steepest possible rise at the edge; at this end, the position information is then obtained by electronic evaluation, the quality (positional resolution) of this information being determined substantially by how well these conditions are adhered to. A further complicating factor in practice is that the wires of the individual wire planes form capacitors among one another, which affect the signal transmission all the more, the closer the wire spacing.

The previously known systems prove to be unsuitable in this respect: The capacitive coupling in of the signals into the delay line, for example as in the Kaplan et al paper or as in U.S. Pat. No. 3,772,521 to Perez-Mendez, is associated with major signal loss, which necessarily increases the proportion of noise, i.e., lowers the signal-to-noise ratio; the consequence is impairment of the "shape fidelity" of the signal and thus poorer positional resolution. Coupling the signals into a segmental, discrete or lumped delay line as in the Gabriel et al paper requires extremely accurate calibration, which must be performed in each individual case, of the capacitances of each segment, in particular in order to reduce signal reflection that also impairs the "shape fidelity" of the signal and hence the positional resolution. In mass production, this is unattainable at reasonable expense.

SUMMARY OF THE INVENTION

It is therefore an object of the invention to construct the counting chamber and delay lines of such proportional counters in such a way that, while minimizing the spacing among the grids and having a mechanically and electrically simple design, an effective increase in the positional resolution is attained.

The above and other objects are attained, according to the invention, in that the wires of the two wire grids used for evaluation are connected directly to the windings of the continuous delay line, which is provided with at least one continuous capacitor strip parallel to and at a defined distance from one of its coil faces, and that the capacitance of the delay line is selected to be substantially greater than the capacitances between the wires of the wire grids used for the readout.

By means of the direct attachment of the wires of the grids used for the readout to their associated delay line, the aforementioned conditions can be optimally fulfilled, in such a way that the spacing of the cathode grid or grids with respect to the anode grid, which substantially determines the positional resolution, can be reduced to the range of less than 2 mm. Advantageous embodiments of the delay line, the structure of which is disclosed in principle in FRG Pat. No. 30 02 950, provide that with a spacing of the wires of the readout grids of 2 mm from one another, the width of the capacitor strip is approximately 2 cm and its spacing from the top of the coil is approximately 10–20 $\mu$, and the number of coil turns is 30 per cm. With such an arrangement, a ratio of delay to rise time of 25 can be attained, and the pulse height loss in the delay line can be limited to less than 10%. The capacitance effected by the capacitor strip is high enough that the disruptive capacitances of the parallel wires play virtually no further role, and the signal shape is not unfavorably affected, because those capacitances amount to a total of only approximately 200 pF.

This direct attachment, in combination with the structure of the delay line, enables such high-quality electronic pulse processing in the delay line that positional resolutions of approximately 1 mm with beta radiation are attainable in the ensuing electronic evaluation.

According to a further feature, a total of three grid planes are provided, one anode grid being disposed between two cathode grids whose wires are orthogonal to one another. Preferably, two of these grids are secured on a common frame, so that by suitably precise mechanical machining of the surface zones of this frame that are parallel to one another, it is also assured that the spacing between these two grids can be adhered to precisely. For the third grid plane, the second cathode grid, a further frame is provided, which is mounted on the first frame.

Alternatively, it may also be provided that only two grids are provided, on a common frame, and in this case the anode grid is at the same time used for reading out the pulses and is connected to a delay line. With this arrangement, a particularly flat and exact structure of the grids is possible. The frame, or the two frames, having the grids form the counting chamber, which is optionally provided with a covering at the top and bottom in order to attain a closed volume of counting gas.

To improve the positional resolution further, the counting chamber is preferably operated with a counting gas that includes methylal and/or n-pentane and/or Freon and/or $CO_2$ as additives, in a total volumetric proportion of from 1 to 5%.

However, the counting chamber can in principle be operated with "standard" counting gas, without these additives. "P 10 gas", which is 90% argon and 10% methane, can be used, or xenon, especially for detecting gamma radiation.

According to a further feature, the counting chamber with this structure is stationarily accommodated inside a housing that is provided with a removable window on top. If the counting chamber is closed at the top with such a window, and the specimen holder closes off the counting chamber at the bottom, then it is consequently possible to see all the way through the housing and through the counting wire planes at the plate being measured, so that it becomes a simple matter to check whether the plate has been put properly into place or whether any contaminants are present that would hinder proper measurement.

In further accordance with the invention, the housing is made in two parts, the counting chamber being disposed in the upper part and the bottom of this upper part being formed as a frame the opening of which is disposed below the grid of the counting chamber, and the inside cross section of which is at least equal to the area of the wire grids.

This creates an introduction opening that, according to a further feature, is advantageously arranged such that a device used for feeding specimen holders through this feed opening is accommodated in a lower part of the housing, on which the upper part is mounted.

This feed device substantially includes a drawer-like shuttle carriage with a holder plate, which is movable inwardly and outwardly from the lower part of the housing; in its position below the counting chamber, this carriage moves the specimen plate upwardly through the feed opening of the upper part, until the plate rests on the underside of the counting chamber.

Other structural features of this feed device are described below.

This embodiment of the invention enables fully automatic measurement of a specimen plate, which needs merely to be placed on the shuttle carriage outside the housing, from which it can be removed once again after measurement.

To supplement this device, in further accordance with the invention, a magazine that receives a plurality of specimen holders is positioned before the shuttle carriage insertion opening. This magazine may be equipped with a plurality of receiving planes, which are vertically movable, so that the shuttle carriage can remove a number of specimen holders from the magazine in succession, measure them, and return them to the magazine.

Two exemplary embodiments of the counting chamber and its housing according to the invention will now be described in detail, referring to the drawings.

DESCRIPTION OF THE PREFERRED EMBODIMENTS

Figure 1:
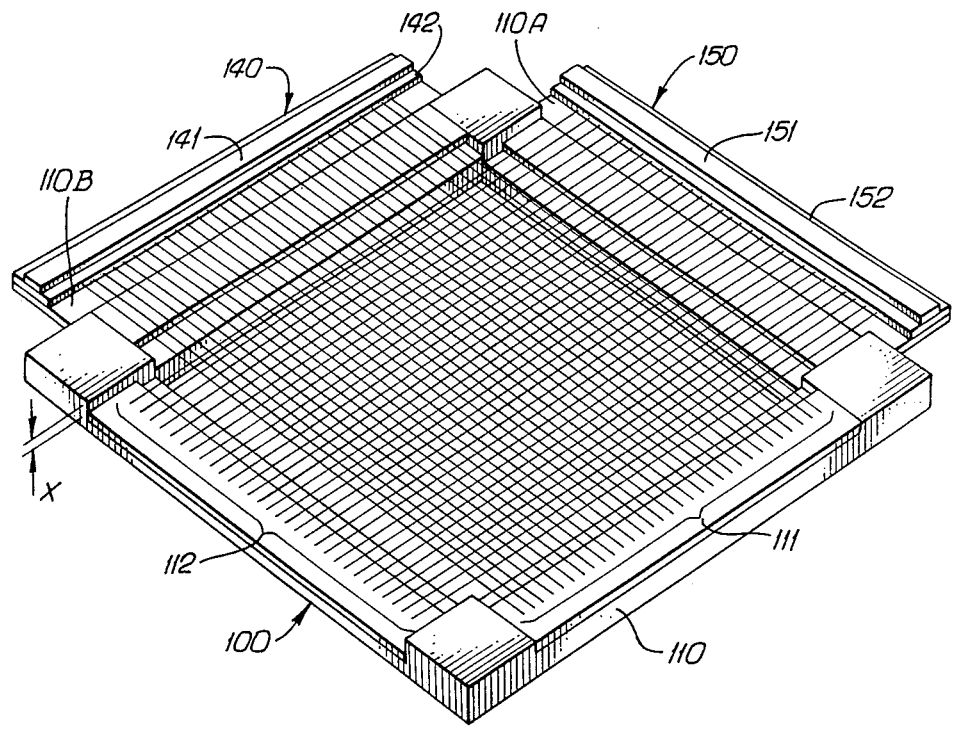
FIG. 1 is a perspective view of a first exemplary embodiment of a counting chamber according to the invention having two wire grid planes.

FIG. 1 shows a first exemplary embodiment, according to the invention, of a counting chamber 100, in which for the sake of simplicity, any upper and lower coverings provided, for example in the form of windows, are not shown. The side walls of counting chamber 100 are formed by a square frame 110. Two opposed sides of this frame 110 are recessed by a distance X with respect to the remaining rim, to form recessed rim zones which define a plane which is lower, by the distance X, than the plane defined by rim zones located orthogonally thereto. One rim zone of each of the two planes is provided with an attachment part 110A, 110B. Located on each attachment part 100A, 100B is a respective delay line 140, 150 and each delay line comprises an insulator core about which windings of a coil are wound, and also comprises a capacitor strip 141, 151 on the top of the respective delay line.

Wires that are joined at regular, i.e. equal, intervals to the windings of the coil (the coils being only partly shown in FIGS. 1 and 2, for simplicity) are stretched crosswise over frame 110 and are fastened on the opposite side of frame 110. This produces two wire grids 111, 112 extending orthogonally to one another, spaced apart from one another by the distance X.

These two grids 111 and 112 serve to read out pulses, which are produced at a specific site on the counter surface inside counting chamber 100 by charged particles. At a specific site, a pulse is thus generated in both grids upon such an event, which pulses reach the associated delay lines 140, 150 and from there are fed in a known manner to an evaluation unit. Based on the transit times of the pulses, the evaluation unit ascertains the coordinate, and hence the point of origination, of the pulse in the counting chamber.

In the exemplary embodiment of FIG. 1, one grid is used as the cathode grid, that is, is used only for reading out the pulses, while the other grid is contrarily connected to anode potential and serves simultaneously both for readout and for supplying high voltage to the counting chamber.

Figure 2:
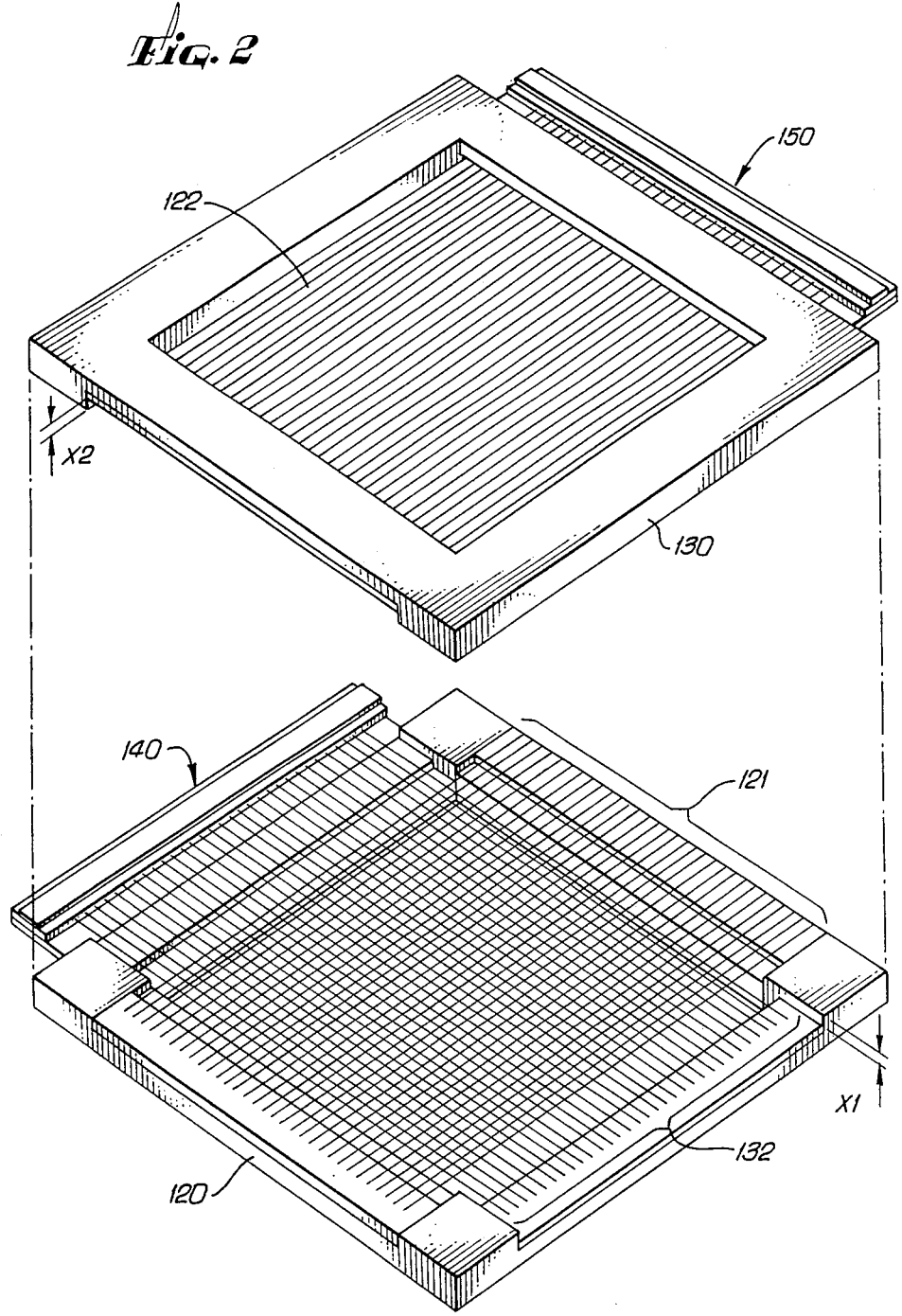
FIG. 2 is an exploded view of a second exemplary embodiment of a wire chamber having three wire grid planes.

In the second exemplary embodiment of the counting chamber according to the invention, shown in FIG. 2, these functions are separated; that is, two cathode grids 122, 132 and one anode grid 121 located in between them in the middle are provided for the readout. The lower cathode grid 132 and the anode grid 121, as in the first exemplary embodiment of FIG. 1, are located in a common frame 120, but only one delay line 140 is associated with it. The second cathode grid 122 is fastened into a second frame 130, which then also supports the second delay line 150. By means of suitable notches formed in frames 120, 130, distances X1, between the planes of grids 121 and 132, and X2, between the planes of grids 121 and 122, are attained as described above, when the two frames 120 and 130 are placed on one another to form counting chamber 100.

Figure 3:
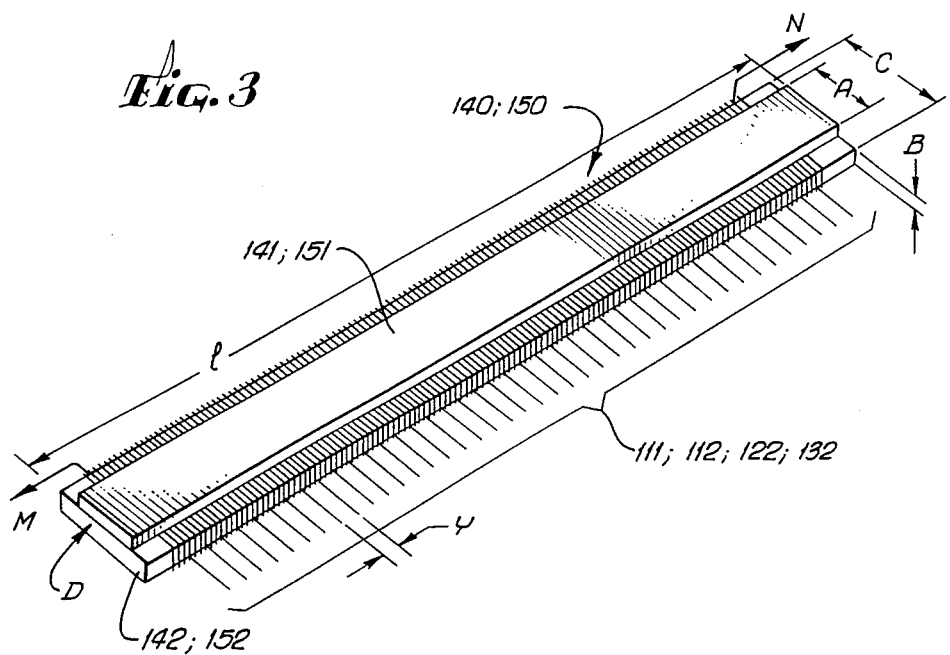
FIG. 3 is a detailed perspective view of the delay line shown in FIGS. 1 and 2.

FIG. 3 shows a detail of one of the delay lines 140, 150, such as are used in the counting chambers of FIGS. 1 and 2. Each delay line 140, 150 comprises a flat insulator core 142, 152, about each of which the windings of one coil are wound. According to a preferred exemplary embodiment, the insulator core has a width C of 25 mm and a thickness B of 1.5 mm, with a total length 1 of 20 cm. The coil is wound about this insulator core with a winding number, or pitch, Z of 30 turns per centimeter. Located on top of the thus-formed coil is a metal strip, functioning as a capacitor strip, 141/151, having a width A of 2 cm, and disposed at a spacing D of 20 $\mu$ from the coil surface. The individual wires of the wire grids 111/112/122/132 are connected at equal intervals y of 2 mm to the windings of the associated coil, on its narrow side, in direct contact. For example, each wire is recessed in a winding turn groove or the like, so that every sixth winding of the coil is provided with a wire connection.

A delay line of this structure has an inductance of approximately $10^{-4}$ Hy, a capacitance of approximately $10^3$ pF and an impedance $Z_o$ of 320Ω. These parameters and their interrelationship are discussed in an article by P. Lecomte, et al., in *Nuclear Instruments and Methods* 153 (1978) pp. 543–551. At these values, a signal coupled into the wires is transmitted optimally, that is without distortion and minimally attenuated, to the ends M, N of the delay line, the minimal pulse height loss of less than 10% being due substantially to the direct coupling of the wires of the grid to the windings of the delay line coil.

Figure 4:
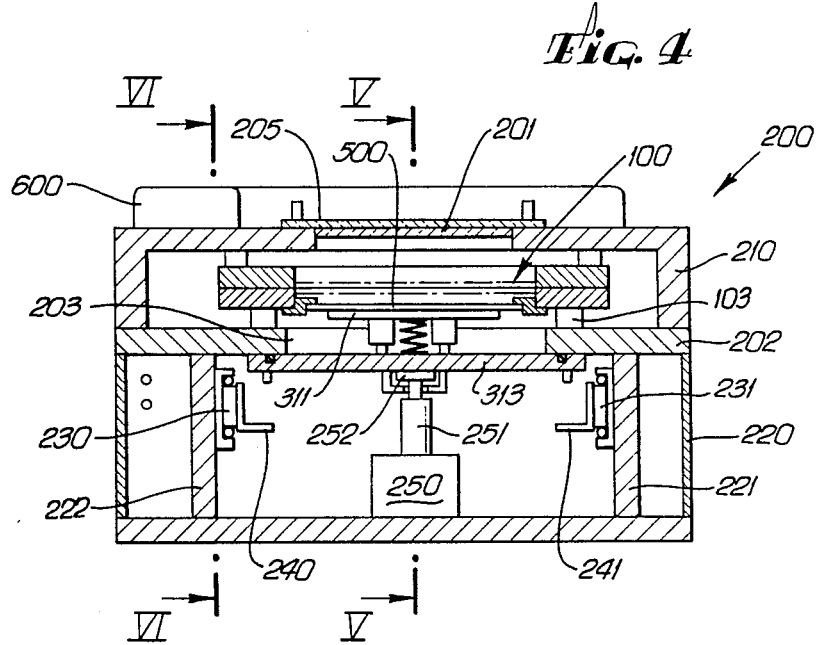
FIG. 4 is a first cross section through the proportional counter in the plane IV—IV of FIG. 6.
Figure 5:
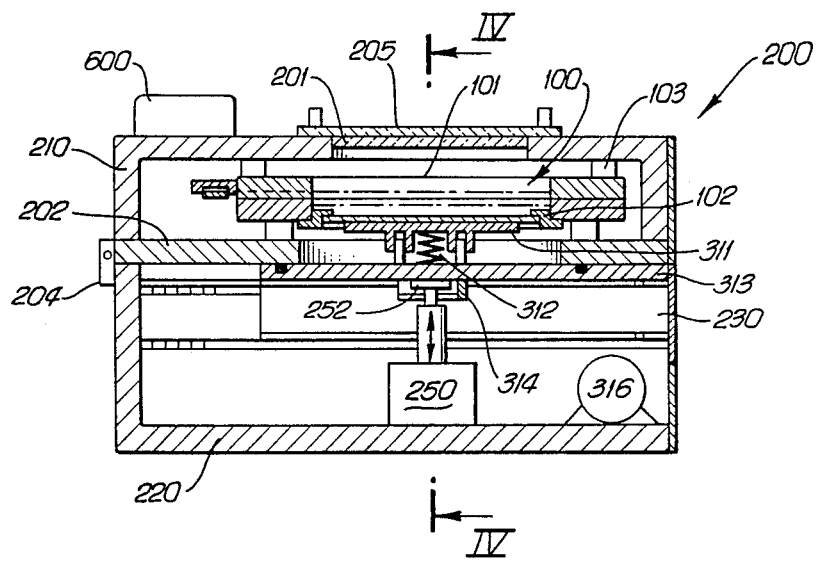
FIG. 5 is a second sectional view in the plane V—V of FIG. 4.
Figure 6:
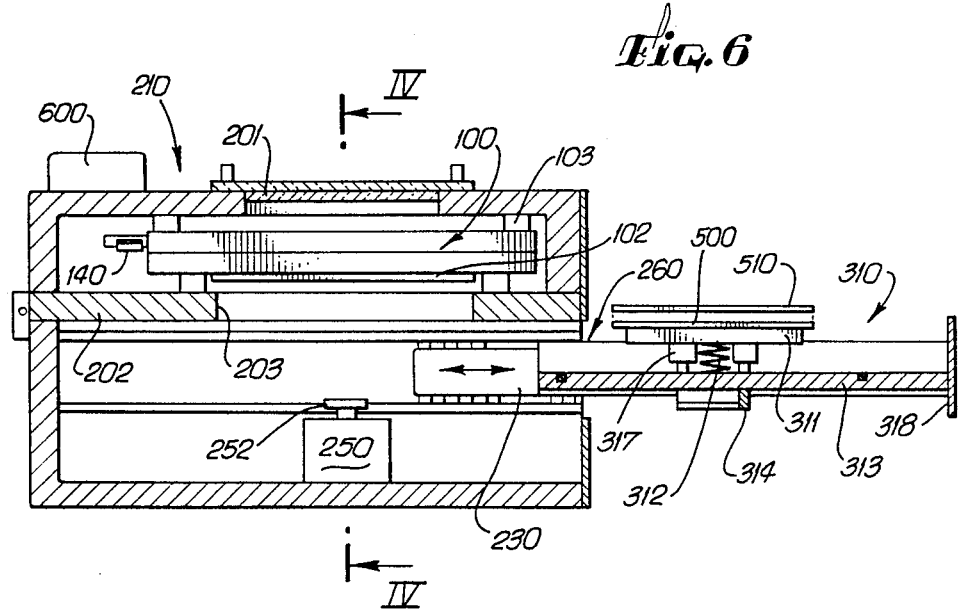
FIG. 6 is a third sectional view with the shuttle carriage in its outer position in the plane VI—VI of FIG. 4.

FIGS. 4–6 are cross-sectional views through a complete proportional counter, in which the counting chamber 100 described with reference to FIG. 2 and made up of two frames 120, 130 is accommodated.

The proportional counter comprises a housing 200, which in turn is composed of two parts, namely an upper part 210 and a lower part 220. Upper part 210 and lower part 220 are joined together collapsibly or pivotably via a joint 204. Upper part 210 serves to receive counting chamber 100, which is covered at the top by a counting chamber window 201. The bottom of upper part 210 is formed by a frame 202 which has a central opening 203. Opening 203 is located beneath the planes of the grids of counting chamber 100. Counting chamber 100 is supported at the top and bottom on bases 103.

For fixation of a test specimen to the underside of counting chamber 100, profiled rails 102 are laid along the inside of lower rim of counting chamber 100; their function will be explained hereinafter.

While, as described above, upper part 210 of housing 200 substantially serves to receive counting chamber 100 and an extension 600 for the electronic detection means, lower part 220 is formed for receiving a feed device for a specimen plates 500, as follows:

Horizontal telescoping rails 230, 231 are retained on inner side walls 221, 222 of lower part 220, and angle profiles 240, 241 are each secured to the inside of one of rails 230, 231. These telescoping rails 230, 231 thus extend on both sides of opening 203 of frame 202. The horizontal faces of angle profiles 240, 241 serve to receive a base plate 313, which is releasably mounted there, the vertical faces of the angle profiles 240, 241 simultaneously serving as both vertical retainers and guides for base plate 313.

A motor 316 depicted in FIG. 5 may drive these telescoping rails or angle profiles via a conventional rack drive, so that consequently base plate 313, when supported on angle profiles 240, 241, is movable horizontally out of the lower part 220, as shown particularly in FIG. 6.

Located on base plate 313 are vertically telescoping elements 317, which receive a holder plate 311 on which a plate 500 to be measured can be placed. A spring element 312 that presses holder plate 311 upwardly is disposed between telescoping elements 317. A front plate 318 is attached to the front side of base plate 313 or of telescoping rails 230, 231; front plate 318, in the inserted state, covers the opening in lower part 220 of housing 200.

Base plate 313 and the remaining components described above thus form a shuttle carriage 310 which operates in the manner of a drawer for moving a specimen 500 to be measured from outside housing 200 into the region below counting chamber 100. A pocket-like attachment 314, open at its end which is oriented toward housing 200, and thus presenting an entry opening, is located on the underside of base plate 313.

A vertical drive assembly 250 having a piston 251 is located approximately centrally below counting chamber 100 in upper part 210, on the bottom of lower part 220. Piston 251 is displaceable upwardly toward counting chamber 100 and is operable either hydraulically, pneumatically or electrically. The upper end of piston 251 carries a plate-like extension 252 which, in the lowered or retracted state of piston 251, is located at the same level as the entry opening of attachment 314 beneath base plate 313, so that when shuttle carriage 310 is inserted into housing 200, attachment 314 slides around extension 252, as shown particularly in FIG. 5.

A soon as the position shown in FIG. 5 is attained, drive assembly 250 can be operated to displace piston 251 upwardly, until first holder plate 311 presses specimen plate 500 to be measured against profiled rails 102 of counting chamber 100 and then, with compression of spring element 312, pushes base plate 313 against frame 202 from below. In this position, the measurement operation can begin.

As further shown in FIG. 6, a collimator plate 510 may be provided so as to be interposed between the counting chamber grids and a specimen on a plate, e.g., 500. Plate 510 can be a perforated plate of metal, plastic, or glass constructed in a known manner with cylindrical or honeycomb-shaped holes. Plate 510 can be mounted upon any one specimen holder 500-504 or can be mounted as part of chamber 100.

Figure 7:
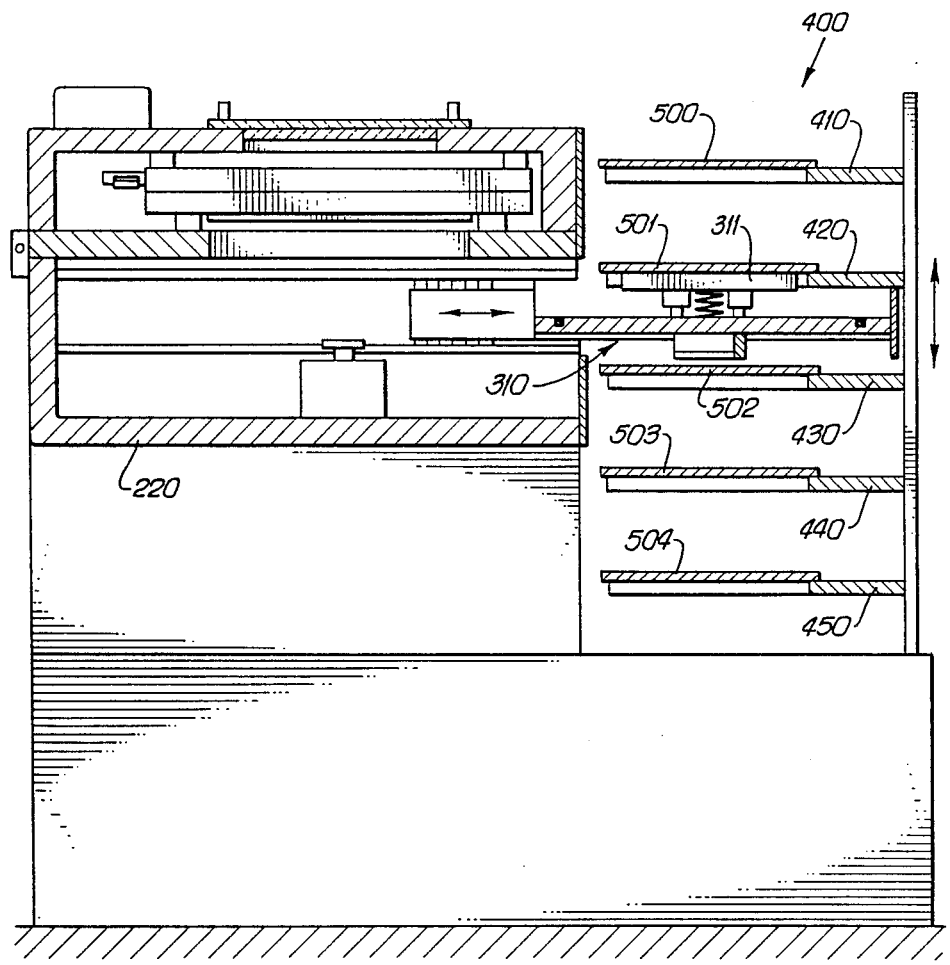
FIG. 7 is a schematic sectional view through the proportional counter with an associated magazine.

FIG. 7 shows, in cross section, how the proportional counter can be equipped, for further automation of the measurement process, with a magazine 400 that has a plurality of receiving planes 410, 420, 430, 440 and 450, each of which has a forked shape, so that on the one hand a plurality of radioactively labelled plates 500, 501, 502, 503 and 504 which are to be measured can be supported, and on the other hand the shuttle carriage 310 can engage a selected plate 500, 501, 502, 503, or 504 from below and raise it from the receiving plane 410, 420, 430, 440, or 450. By means of a controlled vertical movement of magazine 400, a plurality of specimen holders 500 . . . 504 can be measured fully automatically in succession, as will be described in further detail below. It will be understood here that the described sequences of events may, for instance, be controlled by a central computer, if suitable conventional sensors or contact elements are attached at the various positions for shuttle carriage 310 and/or magazine 400 and then successively control the individual drive units. This is within the competence of one skilled in the art and accordingly will not be described in detail here.

One working cycle will now be described, beginning at the position shown in FIG. 7:

Shuttle carriage 310 is located outside of lower part 220 and is in its forwardmost position, such that holder plate 311 comes to rest beneath the center of specimen holder 501. Once this position is attained, magazine 400 moves down a short distance so that specimen holder 501 no longer rests on the receiving plane 420 of magazine 400 but instead rests solely upon holder plate 311. Once magazine 400 has reached this lower waiting position, motor 316 is activated and operates via a rack drive to pull shuttle carriage 310 into the interior of lower part 220, until top extension 252 of drive assembly 250 has moved into attachment 314 on the underside of base plate 313. Once shuttle carriage 310 has reached this rear terminal position, drive assembly 250 is activated via a suitable contact, whereupon its piston 251 displaces base plate 313, with holder plate 311 and the specimen to be measured, upwardly until the specimen rests on profiled rails 102 below counting chamber 100. This upward movement is then continued, counter to the force of spring element 312, until base plate 313 rests on the underside of frame 202. In this position, which is shown in FIGS. 4 and 5, the actual measurement can be performed, which will be described in detail below.

Once the measurement is completed, the process takes place in reverse; shuttle carriage 310 returns, with the measured specimen, into magazine 400 below receiving plane 420; magazine 400 is moved upwardly until the measured specimen is again resting on receiving plane 420 and is separated from holder plate 311. Shuttle carriage 310 is thereupon returned into lower part 220, and magazine 400 is raised or lowered, as desired, by the distance between one or more receiving planes. Once this has been done, shuttle carriage 310 moves outwardly again and picks up the next specimen on holder plate 311, whereupon the cycle described above begins again.

Figure 8:
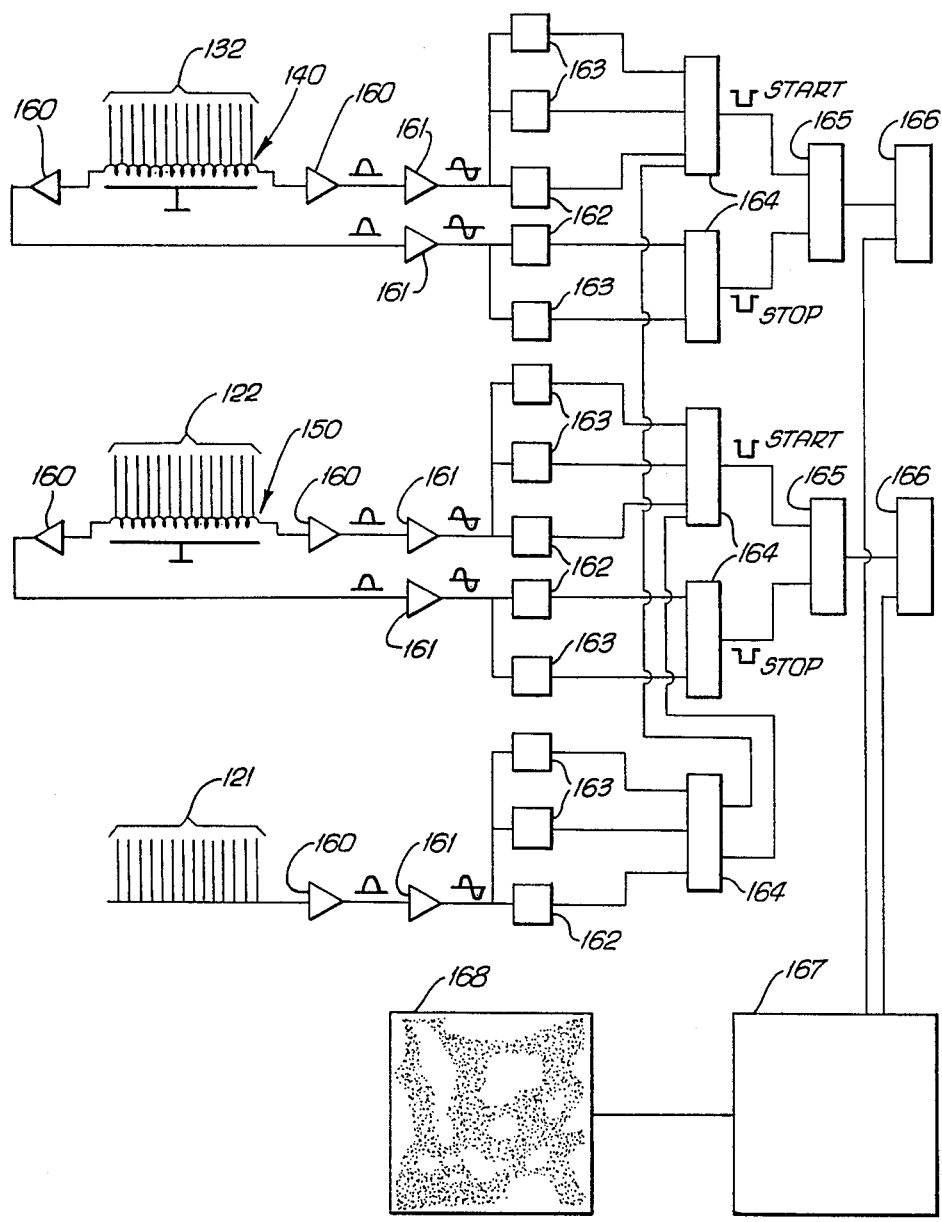
FIG. 8 is a block circuit diagram of the evaluation unit of a counter according to the present invention.

FIG. 8 is a block circuit diagram of an evaluation unit which can be used with a counter according to the invention. This evaluation unit is associated with a counting chamber such as that shown in FIG. 2, that is a counting chamber having two cathode grids 122 and 132 and one anode grid 121. FIG. 8 schematically shows how the two cathode grids 122, 132 are each connected to "their" respective delay line 150 or 140. The signals coupled in from the wires of the respective cathode grids travel in a manner known per se to the two ends M, N of the respective delay line 140, 150, and from there they are conducted via preamplifiers 160 and shaping amplifiers 161, which function as differentiators, to zero passage detectors 162 and pulse height discriminators 163. Zero passage detectors 162 serve to measure the transit time; pulse height discriminators 163 serve to filter out lower amplitude pulses, for example due to noise, and/or pulses that are located above a maximum selected height.

Once a pulse in the thus-defined pulse window has made its zero passage, the following coincidence stages 164 produce start and stop signals, the period of time between associated start and stop signals representing the difference in transit time between the two pulses picked up at the ends of a delay line and thus containing the positional information.

Each stage 164 which generates a "stop" signal is associated with a delay element which has a delay at least equal to that of the associated delay line 140, 150, and which assures that, regardless of the point of origin of the signal pulses in the chamber, a "stop" signal will always follow a corresponding "start" signal and the time therebetween will be representative of the location of the event which triggered a cathode grid pulse. Such a delay arrangement is described in Gabriel, et al., "Linear, Circular and Two Dimensional Position Sensitive Detectors", *Nuclear Instruments and Methods* 152 (1978), pp. 191–194.

A common time/amplitude converter 165 is connected to the output side of each of pair of coincidence stages 164 and produces a signal having an amplitude corresponding to this time difference. Analog/digital converters 166 convert the signals from time/amplitude converters 165 into digital form and pass the digital signals to an evaluation logic 167 in which the origination position of a pulse is calculated from the transit time differences between the signals in the two delay lines 140, 150. These values are stored in memory and can then be visually displayed on a display 168, which for instance produces a display image that is a direct visual representation of the distribution of radioactivity on the plate being measured.

During counter operation, pulses appear on anode grid 121. These pulses can optionally be applied, as shown, to trigger coincidence stages 164 for cathode grids 122 and 132. For example, for particle identification or electronic collimation, the amplitude or energy content of each anode grid pulse can be measured and used to cause only those events to be counted which are associated with a selected range for the measured anode grid pulse parameter.

The positional resolution of the counter can be still further improved if the high voltage is selected to be so high that the counting chamber operation is shifted out of the proportional range into the streamer range.

A still further increase in the high voltage is possible as well; in that case, the counting tube functions as a spark chamber.

If the counter is operated in these modes outside of the proportional range, then the term "proportional counter" should be modified accordingly.

This application relates to subject matter disclosed in Federal Republic of Germany Application No. P 37 35 296.2-33, filed on Oct. 17, 1987, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a two-dimensional proportional counter for position sensitive measurement of ionizing radiation in one plane, the counter having a counting chamber with a wire anode grid and at least one wire cathode grid spaced from, and located above or below the anode grid, each grid being composed of a plurality of parallel wires, two of the grids of the chamber being used for readout and the wires of one of the two grids extending transversely to the wires of the other one of the two grids, the counter further having two delay lines each associated with a respective one of the two readout grids and the wires of each readout grid being connected to its associated delay line so that the pulses generated in each wire are coupled into a defined point of the associated delay line, and the counter further including an evaluation unit connected to the delay lines to receive pulses therefrom to effect position determination, the improvement wherein: each said delay line is a continuous delay line composed of a coil constituted by a plurality of windings and a continuous capacitor strip parallel to and at a defined spacing from said coil; the wires of each of said two readout grids are connected directly to the windings of the associated coil; and each said delay line is constructed to have a capacitance which is substantially greater than the capacitances between the wires of the associated readout grid.

2. A proportional counter as defined in claim 1 wherein the distance between adjacent grids is a maximum of 2 mm.

3. A proportional counter as defined in claim 1 wherein the inductance of each said delay line is approximately $10^{-4}$ Hy, its capacitance is approximately $10^{-9}$ F and its impedance $Z_o = 320$ ohms.

4. A proportional counter as defined in claim 3 wherein the length of each said delay line is 20 cm, each said coil has a winding pitch of 30turns/cm, each said the capacitor strip is spaced approximately 20 $\mu$ from its associated coil, and the distance between the wires of at least one readout grid is approximately 2 mm.

5. A proportional counter as defined in claim 1 wherein one said cathode grid and one said anode grid constitute readout grids.

6. A proportional counter as defined by claim 5, wherein said counting chamber is closed and is filled with a counting gas that contains at least one additive selected from among methylal, n-pentane, Freon and $CO_2$, in a total volumetric proportion of up to 5%.

7. A proportional counter as defined in claim 6 wherein said anode grid is connected to be at a potential selected to cause said counter to operate in the streamer range.

8. A proportional counter as defined in claim 6 wherein said anode grid is connected to be at a potential selected to cause said counter to operate as a spark chamber.

9. A proportional counter as defined in claim 1 wherein there are two said cathode grids constituting readout grids, and said anode grid is disposed between said cathode grids.

10. A proportional counter as defined in claim 1, wherein said counting chamber is a closed counting chamber containing said grids, and said counting chamber comprises at least one frame forming side walls of said counting chamber.

11. A proportional counter as defined in claim 10 further comprising a collimator plate of metal, plastic or glass mounted to be interposed between said grids and the location of a specimen to be measured.

12. A proportional counter as defined in claim 11 wherein said collimator plate is a perforated plate having cylindrical or honeycomb-shaped holes.

13. A proportional counter as defined in claim 10 further comprising a housing in which said counting chamber is immovably disposed.

14. A proportional counter as defined in claim 13 wherein said housing has a top wall provided with a window.

15. A proportional counter as defined in claim 12 wherein said housing comprises an upper part and a lower part disposed below said upper part, said counting chamber is disposed in said upper part, said upper part comprises a frame member forming the bottom of said upper part, and said frame member has an opening which is disposed beneath said grids and which has a cross section equal at least to the area of said grids.

16. A proportional counter as defined in claim 15 wherein said upper part of said housing is mounted on said lower part, and further comprising a transporting device disposed in said lower part for transporting a specimen holder.

17. A proportional counter as defined in claim 16 wherein said transporting device comprises a drawer-like shuttle carriage provided with a support plate for supporting a specimen holder, and said transporting device is movable for bringing said support plate to a location beneath said opening in said frame member.

18. A proportional counter as defined in claim 17 wherein said carriage comprises a base plate supporting said support plate, and a spring element interposed between said base plate and said support plate for urging said support plate upwardly away from said base plate.

19. A proportional counter as defined in claim 18 wherein: said carriage is movable into an inserted position within said housing; said base plate is vertically movable; said counter further comprises a drive assembly disposed at the bottom of said lower part below said opening in said frame member for moving said base plate vertically; and said drive assembly comprises a piston disposed to engage the underside of said base plate when said carriage is in the inserted position for moving said base plate upwardly to bring said base plate into engagement with said frame member while said spring element urges said support plate against the bottom of said counting chamber.

20. A proportional counter as defined in claim 19 wherein said piston is movable vertically between a raised position and a lowered position and has an upper end provided with a plate-like extension, and said base plate has an attachment disposed at the underside of said base plate and defining a recess for receiving said extension when said piston is in its lowered position and said carriage moves into its inserted position.

21. A proportional counter as defined in claim 19 further comprising profiled rails disposed at the bottom of said counting chamber for engaging said support plate when said base plate is in engagement with said frame member.

22. A proportional counter as defined in claim 18 further comprising a plurality of telescoping elements supporting said the support plate on said base plate.

23. A proportional counter as defined in claim 17 further comprising a motor and a rack drive coupled to the underside of said carriage for displacing said carriage relative to said housing.

24. A proportional counter as defined in claim 17 further comprising telescoping rails mounted in said lower part of said housing and supporting said carriage for movement relative to said housing.

25. A proportional counter as defined in claim 23 further comprising angled profile members which are secured to said telescoping rails and on which said base plate rests.

26. A proportional counter as defined in claim 17 wherein said housing has an insertion opening in said lower part for passage of said carriage, and further comprising a magazine for receiving a plurality of specimen holders positioned in front of said insertion opening.

27. A proportional counter as defined in claim 26 wherein said magazine comprises a plurality of horizontal specimen receiving members between which said carriage is movable.

28. A proportional counter as defined in claim 27 wherein said magazine is movable up and down such that any one of said receiving members can be aligned with said carriage.

29. A proportional counter as defined in claim 27 wherein each of said receiving members has a forked form such that said support plate of said carriage is insertable all the way under a specimen holders carried by a respective receiving member.

30. A proportional counter as defined in claim 16 wherein said housing further comprises a hinge or joint via which said upper part and said lower part are joined together.

* * * * *